United States Patent
Patel et al.

(10) Patent No.: US 6,685,092 B2
(45) Date of Patent: Feb. 3, 2004

(54) MOLDED IMAGER OPTICAL PACKAGE AND MINIATURIZED LINEAR SENSOR-BASED CODE READING ENGINES

(75) Inventors: Mehul Patel, Fort Salonga, NY (US); Thomas D. Bianculli, Manorville, NY (US); Thomas Mazz, Huntington, NY (US); Bradley S. Carlson, Northport, NY (US)

(73) Assignee: Symbol Technologies, Inc., Holtsville, NY (US)

( * ) Notice: Subject to any disclaimer, the term of this patent is extended or adjusted under 35 U.S.C. 154(b) by 193 days.

(21) Appl. No.: 09/880,906

(22) Filed: Jun. 15, 2001

(65) Prior Publication Data

US 2003/0024986 A1 Feb. 6, 2003

(51) Int. Cl.[7] .................................................. G06K 7/10
(52) U.S. Cl. .............. 235/454; 235/462.45; 235/472.01
(58) Field of Search ...................... 235/462.45, 472.01, 235/454, 456, 380, 455

(56) References Cited

U.S. PATENT DOCUMENTS

| | | | | |
|---|---|---|---|---|
| 4,743,955 A | * | 5/1988 | Matsumoto | 257/435 |
| 5,444,230 A | * | 8/1995 | Baldwin et al. | 235/462.42 |
| 5,495,097 A | * | 2/1996 | Katz et al. | 235/462.12 |
| 5,596,446 A | * | 1/1997 | Plesko | 359/214 |
| 5,703,349 A | | 12/1997 | Meyerson et al. | |
| 5,724,401 A | * | 3/1998 | Kurtz et al. | 378/171 |
| 5,814,803 A | * | 9/1998 | Olmstead et al. | 235/462.01 |
| 5,864,128 A | * | 1/1999 | Plesko | 235/462.35 |
| 5,925,867 A | * | 7/1999 | Hagimoto | 235/454 |
| 6,073,851 A | * | 6/2000 | Olmstead et al. | 235/462.45 |
| 6,138,915 A | * | 10/2000 | Danielson et al. | 235/472.02 |
| 6,347,744 B1 | * | 2/2002 | Metlitsky | 235/472.02 |
| 6,351,288 B1 | * | 2/2002 | Johnson et al. | 348/373 |
| 6,375,076 B1 | * | 4/2002 | Massieu et al. | 235/462.22 |
| 6,431,452 B2 | * | 8/2002 | Feng | 235/472.01 |
| 6,435,411 B1 | * | 8/2002 | Massieu et al. | 235/454 |

* cited by examiner

Primary Examiner—Michael G. Lee
Assistant Examiner—Kimberly Nguyen
(74) Attorney, Agent, or Firm—Carter, Deluca, Farrell & Schmidt LLP

(57) ABSTRACT

Molded imager optical packages are disclosed which are particularly adapted for use in miniaturized, linear sensor-based code reading engines. The package may include a one-dimensional solid state photo sensor with a small number of cells. A low F-number optical system may be integrally molded in the sensor packaging.

15 Claims, 5 Drawing Sheets

MOLDED IMAGER OPTICAL PACKAGE AND MINIATURIZED LINEAR SENSOR-BASED CODE READING ENGINES

FIELD OF THE INVENTION

The invention relates to imaging systems using solid state sensors for detecting multiple picture elements, including optical code imagers and cameras. Aspects of the invention are particularly useful in linear sensor-based and two-dimensional sensor-based, handheld code readers.

BACKGROUND OF THE INVENTION AND OBJECTS

Optical codes are patterns made up of image areas having different light reflective or light emissive properties, which are typically assembled in accordance with a priori rules. The term "bar code" is sometimes used to describe certain kinds of optical codes. The optical properties and patterns of optical codes are selected to distinguish them in appearance from the background environments in which they are used. Devices for identifying or extracting data from optical codes are sometimes referred to as "optical code readers" of which bar code scanners are one type. Optical code readers are used in both fixed or portable installations in many diverse environments such as in stores for check-out services, in manufacturing locations for work flow and inventory control and in transport vehicles for tracking package handling. The optical code can be used as a rapid, generalized means of data entry, for example, by reading a target bar code from a printed listing of many bar codes. In some uses, the optical code reader is connected to a portable data processing device or a data collection and transmission device. Frequently, the optical code reader includes a handheld sensor which is manually directed at a target code.

Most conventional optical scanning systems are designed to read one-dimensional bar code symbols. The bar code is a pattern of variable-width rectangular bars separated by fixed or variable width spaces. The bars and spaces have different light reflecting characteristics. One example of a one dimensional bar code is the UPC/EAN code used to identify, for example, product inventory.

Bar codes can be read employing imaging devices. For example an image sensor may be employed which has a two dimensional array of cells or photo sensors which correspond to image elements or pixels in a field of view of the device. Such an image sensor may be a two dimensional or area charge coupled device (CCD) and associated circuits for producing electronic signals corresponding to a two-dimensional array of pixel information for a field of view. A one-dimensional linear array of photodiodes is also known for use in detecting a bar code reflection image. See, e.g., U.S. Pat. No. 6,138,915 to Danielson et al.

It is known in the art to use a CCD photo detector and objective lens assembly in an optical code reader. In the past, such systems have employed complex objective lens assemblies originally designed for use in relatively expensive video imaging systems. Such systems may have a single sharp focus and a limited depth of field, which along with conventional aiming, illumination and signal processing and decoding algorithms, limits the versatility and working range of the system.

Other known imaging systems are designed primarily for reading optical codes. Such reading systems involve the assembly and alignment of several small parts. These parts may include a lens, an aperture and a 2D optical detector array such as a CCD chip. Such a structure is illustrated, for example, in U.S. patent application Ser. No. 09/096,578 for Imaging Engine and Method for Code Readers to Correa et al. filed Jun. 12, 1998 and assigned to Symbol Technologies, Inc. The Correa et al. application is hereby incorporated by reference herein.

It is an object of the present invention to further reduce the expense and difficulty associated with providing an optical code reading imaging system.

It is known to provide illumination in optical code readers by employing illuminating devices to supplement ambient light. For example, U.S. Pat. No. 5,703,349 discloses an illumination module comprised of two lines of illuminating LEDs and lens cells. The above mentioned Correa et al. patent application also discloses an illumination system for a hand held optical code imager.

Existing one-dimensional imaging systems utilize off-the-shelf linear CCD detectors. A typical linear detector contains a few thousand pixels and has a total image length of about 28 mm. The focal length for a system using such a detector is approximately 38 mm assuming a field of view of 40 degrees. With a 0.4 mm wide by 6.2 mm high aperture the effective F-number (for light throughput) of the system is 21.4. Significant illumination is required for reasonable performance with such a system, and the device cannot be miniaturized.

It is an object of the present invention to provide an imaging optical code reader which is operable under normal ambient light conditions with little or no supplemental illumination.

It is a further object of the present invention to provide a miniaturized imager with a one-dimensional solid state sensor.

It is a further object of the present invention to provide a miniaturized imager with a two-dimensional solid state sensor.

These and other objects and features of the invention will be apparent from this written description and drawings.

SUMMARY OF THE INVENTION

The present invention relates to methods and apparatus useful in imaging optical code readers and camera systems. Techniques are disclosed which are applicable to the design of imaging engines, imaging lenses, apertures, illumination devices and solid state die packages for code readers and cameras of various types.

In a preferred embodiment of the present invention, an imaging apparatus for an optical code reader may be based on a solid state photo sensor, including an array of photo sensor cells for producing electronic signals corresponding to a one-dimensional or two-dimensional array of pixel information for a field of view. In preferred embodiments, the image sensor is a CMOS device, it being understood that other solid state image sensors may be used for the purpose such as CCD (charge coupled device), CMD (charge modulated device) or CID (charge injection device) sensors. At least one lens is provided for focusing light incident on the image sensor. The lens may be part of an injection molded package of the image sensor. An aperture may also be formed in the molded package.

In preferred embodiments a one-dimensional solid state photo sensor may be employed. The term "one-dimensional" is intended to include linear (either curved, segmented or straight lines of sensors cells). Preferred photo sensors have a relatively low number of cells for example about 1000 (e.g. a 1024 cell array) or about 500 (e.g. a 512 cell array).

The system employs an optical assembly (typically an objective lens and aperture) in focusing light from a target optical code symbol on the photo sensor. Advantageously, the optical assembly has an F-number less than 8, preferably less than 5, more preferably less than about 3. An electronic digitizer may be implemented with a microprocessor and software for converting electrical signals to bit content for the target symbol. In preferred embodiments the digitizer is sufficiently powerful to extract bit content from a target symbol where the number of modules represented in the image focused on the photo sensor is less than or equal to the number of cells of the photo sensor.

The system may be particularly adapted to read pre-aligned conventional one-dimensional bar codes by employing an array of rectangular shaped sensor cells and by employing an elongated aperture such as a cats-eye shaped aperture.

The foregoing techniques may be employed to provide a miniature package having, for example, a focal length less than 5 mm and an overall volume of less than one cubic centimeter.

The present invention also includes techniques for efficiently and inexpensively fabricating an imager optical package containing a solid state photo sensor. According to this technique, a solid state photo sensor such as a one-dimensional sensor die is electrically and mechanically bonded to a lead frame. The sensor and a portion of the lead frame is located in a first mold cavity while injecting a fluid, electrically insulating material into the cavity. The fluid is substantially transparent to incident light to be detected by the photo sensor, for example, visible light, IR light and UV light. The mold cavity includes a region or surface for forming an external lens surface for the package. The transparent material is allowed to solidify into a transparent body which embeds or encapsulates the solid state photo sensor and protects it from environmental damage, while also focusing incident light onto it. In preferred embodiments a shell of opaque material may be injection molded around the transparent body. An aperture may be formed in the opaque shell during the molding process.

The foregoing sensors and techniques may be used in code readers such as those described in U.S. patent application Ser. No. 20030029915 filed on the same date as this application entitled Omnidirectional Linear Sensor-Based Code Reading Engines to Barkan and Patel, assigned to Symbol Technologies, Inc. and hereby incorporated by reference herein.

The foregoing is intended as a convenient summary of the present disclosure. The aspects of the invention sought to be protected are set forth in the claims.

DETAILED DESCRIPTION

I. Molded Optical Package

Figure 1:
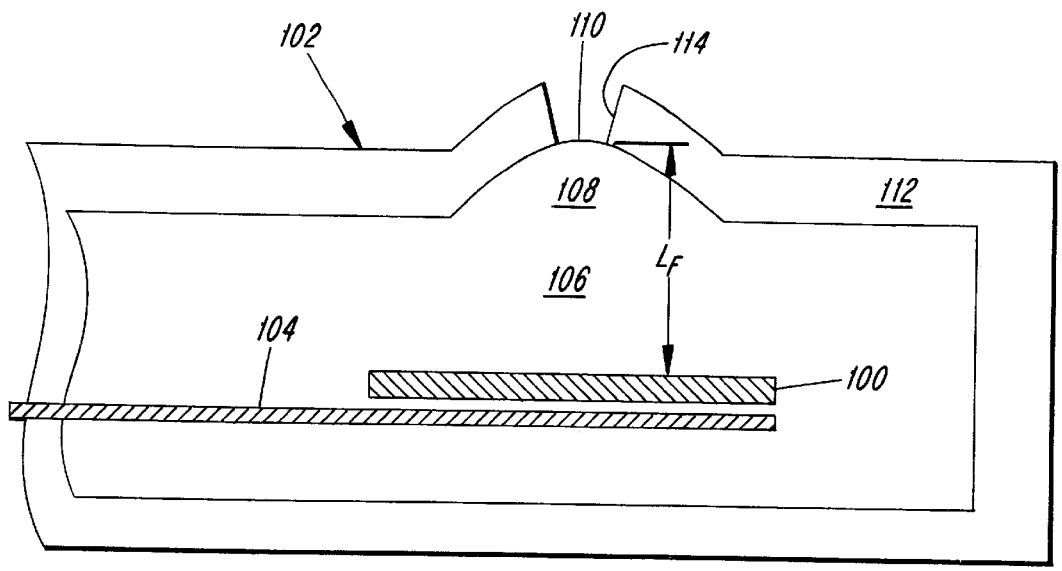
FIG. 1 is a cross-sectional view of a molded imager optical package in accordance with a preferred embodiment of the present invention.

Embodiments of the present invention include imaging code readers and cameras in which a solid state photo sensor with the capacity to detect an array of pixels, is encapsulated in a package. Portions of the package function as an objective lens, aperture and stabilizing medium for maintaining the proper separation between the semiconductor die or chip and the integrally molded lens to provide the desired (usually short) focal length for the system.

In this invention, injection molded packaging for the semiconductor device provides optical functions such as lens and aperture that are not included in conventional molded packages. This approach may be used in optical code readers, cameras, solid state illuminators or single package combinations of the foregoing.

In a camera or code imaging system, a solid state photo sensor die 100, is fabricated by conventional means (for example, using CMOS techniques) and encapsulated in package 102. This photo sensor may have a one-dimensional line of cells for a linear bar code reader or may have cells in a two-dimensional area array suitable for imaging one-dimensional or two-dimensional optical codes or video images of objects or scenes. These devices may also include analog and/or digital signal processing circuitry for performing the additional functions required of a bar code scanner system or camera: exposure control, signal conditioning, digitizing, and decoding.

During fabrication the die 100 may be mounted on a lead frame 104, again using conventional means such as soldering and wire bonding or direct lead frame bonding to the die. Such mounting mechanically attaches and electrically connects the die to the lead frame. This assembly is then placed into a mold cavity for injection molding of a first compound 106. The first compound is clear or has high light transmissivity for the wavelengths of interest. This material also may have a high index of refraction (>1) to enhance the optical power. The mold cavity has a feature to position the lead frame 104, and thus the die 100, with respect to a lens or diffractive optical element (doe) molding feature of the mold cavity. The lens or doe feature of the package 108 is located at a position over the die 100, so as to create the desired focus on the die and the appropriate distance $L_F$ or focal length for the optical system. In a preferred embodiment of a system described below the focal length is about 5 mm (the distance between the chip surface and the optical surface 110 of the portion 108 of the package).

Figure 2:
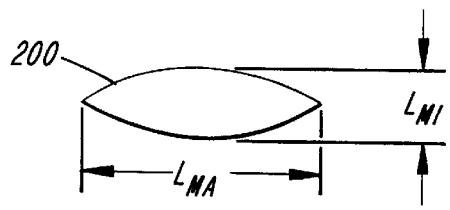
FIG. 2 is a plan view of an aperture structure which may be employed in the embodiments of FIGS. 1 or 3.

A first molding compound is injected into the mold cavity to create a mechanical package for the delicate lead frame and die (and wire bonds) while also providing an accurately located focusing assembly. In a second molding process a second molding compound may be molded around the first to produce an opaque shell 112. An aperture 114 may be formed in the shell to admit light to be focused on the chip 100. In a preferred embodiment of the system described below using a linear array of rectangular pixels, the aperture may be elongated in shape. Such an elongated aperture 200 is shown in FIG. 2. The form of the elongated aperture may be a "cats-eye" shape having a major axis length $L_{MA}$ and a minor axis length $L_{MI}$. In a preferred embodiment, $L_{MA}$ may be 3 mm and $L_{MI}$, may be 1 mm. Alternatively, the aperture may be circular, rectangular or elliptical with various dimensions and aspects ratios, selected in accordance with the function of the device and the F-number desired for the system.

An illuminator may be fabricated using similar techniques. In such a case, a light emitting semiconductor die essentially replaces the photo sensor die 100 on a lead frame 104. Assembly then follows the same process utilizing lens and aperture features suitable for the illumination needs as well as the need to control unwanted stray light emissions.

Figure 3:
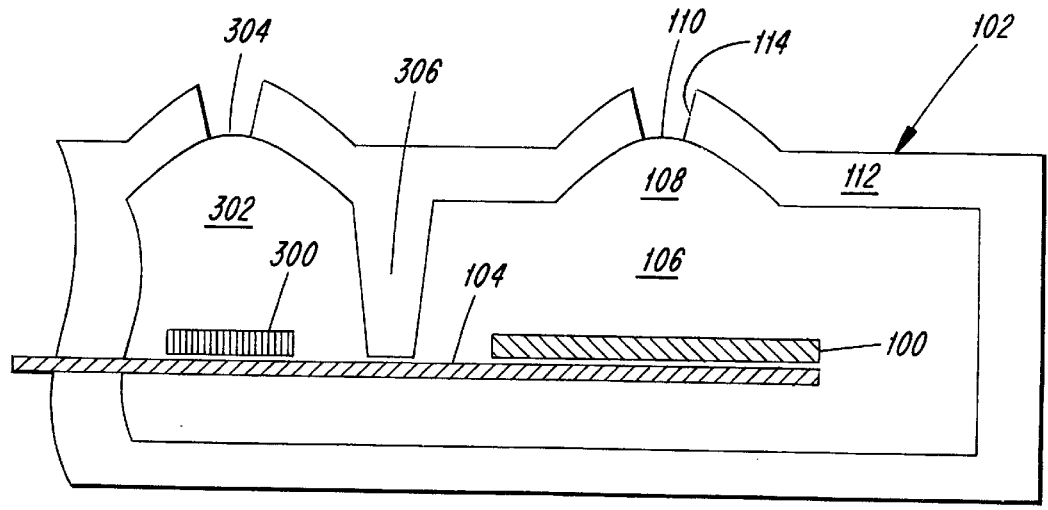
FIG. 3 is a cross-sectional view of a molded imager optical package with a light source, in accordance with another preferred embodiment of the present invention.

FIG. 3, illustrates a further embodiment of the present invention which includes the photo sensor die 100, lead frame 104, first transparent molded body 106, focusing feature 108, optical surface 110 and shell 112 with aperture 114 formed therein. A second die 300 may also be mechanically and electrically attached to lead frame 104. In preferred embodiments the second die is an LED used for illumination or aiming. The first transparent molded body includes a portion 302 which encases the die 300 and provides a second optical element (lens surface or doe) 304 for focusing light produced by the LED.

The imager/illuminator assembly of FIG. 3 thus combines two or more die on the same lead frame and molded in the same two step process. Undesirable light coupling between the illumination die and the photo sensor die may be controlled within the package. More specifically, an opaque light blocking portion 306 between the illuminating die 300 and the photo sensor die 100 may be formed when molding the shell 112 as shown in FIG. 3.

In both embodiments of FIGS. 1 and 3 the final assembly may be further processed to form the lead frame for subsequent mounting in the final product, for example, for mounting to a circuit board.

II. Miniaturized Linear Sensor-Based Code Reading Engines

Off-the-shelf image detectors used in bar code readers typically have large numbers of cells. Such readers use hardware digitizers to digitize the image signal in real time so that it does not have to be stored in memory. If fewer cells are used, they will collect more light and minimize the auxiliary illumination required. However, fewer cells introduce blur in the image which may not be tolerated by conventional hardware digitizers.

Contemporary, inexpensive microprocessors have enough computing power to execute sophisticated image processing algorithms in real time. An example of such a digitizer is disclosed in U.S. patent application Ser. No. 09/096,164 to He et al. filed Jun. 12, 1998 entitled "Digitizing Bar code Symbol Data" and assigned to Symbol Technologies, Inc. The He et al. application is hereby incorporated by reference herein. This high blur digitizer can easily run on a 16-bit, 20 MHZ microprocessor in hundreds of milliseconds or less. Furthermore, the microprocessor has sufficient on-chip RAM to process image containing up to about 1000 pixels.

Using such a sophisticated software digitizer the number of cells needed in the photo sensor can be reduced to several hundred (of course, more cells can be used for increased range). One advantage of using a small number of cells is that each cell receives more light from a fixed field of view compared to a system with a larger number of cells. Another advantage is that a photo sensor with fewer cells is simpler to build and lower cost. In addition the memory requirements of the system are reduced.

Software digitizers of the above-mentioned type are designed to operate on highly blurred images. This means the system can tolerate a small F-number and still have adequate working range. F-number is the conventional measure of relative aperture of the system. For the case of lens system with a circular pupil of diameter D, the F-number is defined as:

$$F\text{-number} \equiv \frac{f}{D}$$

where f is the focal length of the lens system. In preferred embodiments of the present invention f is less than about 15 mm, preferably less than about 5 mm; D is less than about 1 mm; and thus F-number is less than about 15, preferably less than 5 to 10, more preferably less than about 3.

A small F-number allows the system to operate with ambient light only, so that auxiliary illumination may not be required. The amount of light impinging on a photo detector is proportional to:

$$\frac{1}{(F\text{-number})^2} * (\text{scene illumination})$$

The use of a small F-number for a system such as a bar code reader that requires significant depth of focus is counterintuitive The high blur digitizer also enables the system to use a detector with very tall cells (as much as 20:1 ratio of height to width). This improves the sensitivity of the system because each cell collects more light. The advancement of CMOS technology for manufacturing imaging devices in recent years enables the cost effective development and volume production of such custom linear detector arrays.

Figure 4:
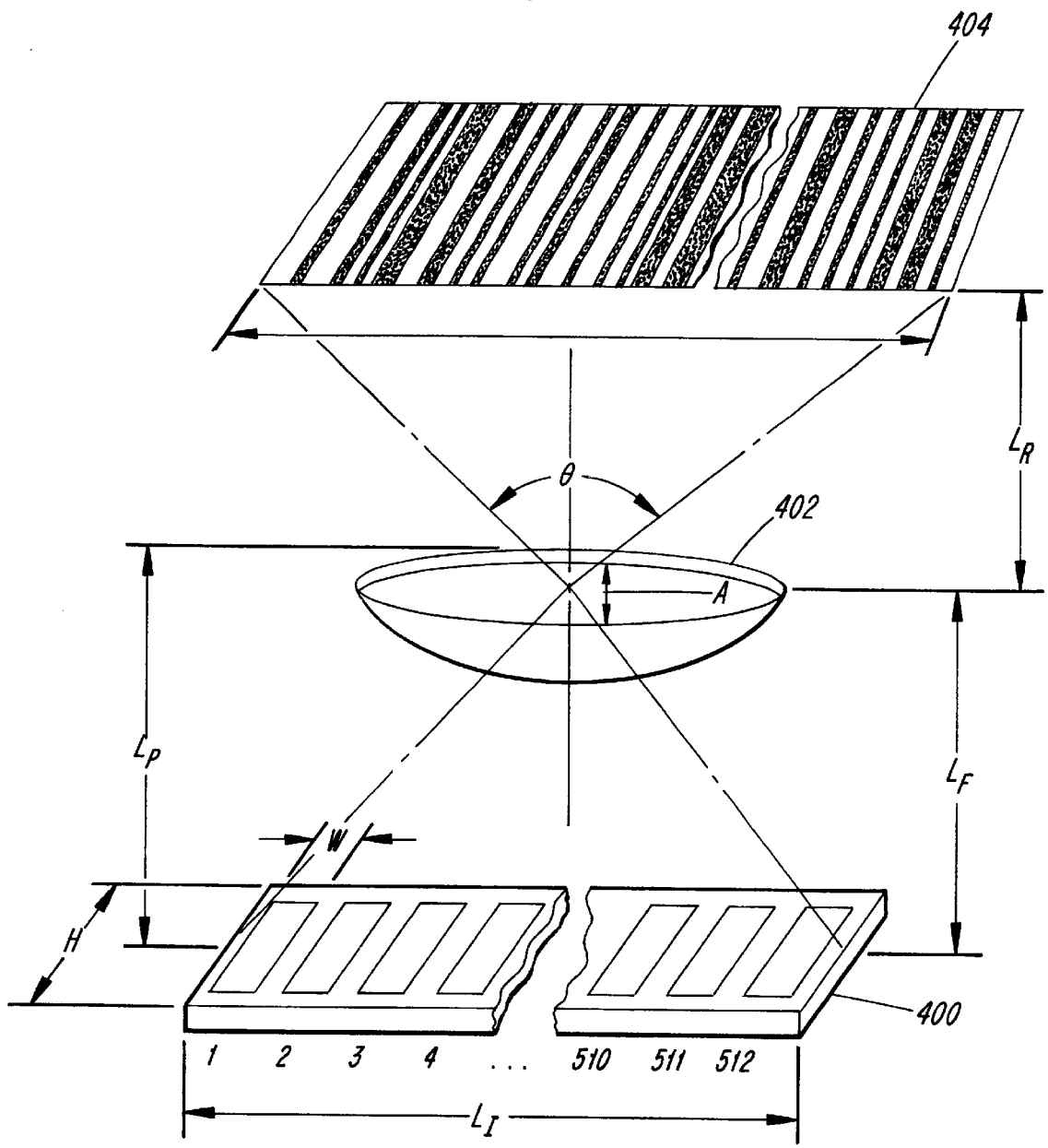
FIG. 4 is a pictorial schematic view (not to scale) illustrating certain features of a linear sensor-based code reading engine embodiment of the present invention.

An example of an embodiment of the present invention is illustrated in FIG. 4. A solid state photo sensor 400 used in the system may contain, for example, a linear array of 512 rectangular cells. The cells may have a height H to width W ratio of as much as 20:1. In one embodiment the pixels may be 8 μm wide and 120 μm tall. Another embodiment employs 8 μm wide by 65 μm tall pixels.

The preferred embodiment of FIG. 4 employs a photo sensor 400 with 512, 8 μm wide by 125 μm tall cells. An objective lens 402 and target bar code symbol 404 are also shown. The image length $L_I$ is about 4 mm. For a field of view θ of 40 degrees, the focal length $L_F$ is about 5 mm. This results in a minimum package dimension $L_P$ of 6 mm, a lower bound on the physical volume of an engine with this detector is about 0.22 cm$^3$, i.e., significantly less than one cubic centimeter. This engine is 50 times smaller than can be achieved with off-the-shelf CCD detectors which are used in conventional scanners. Alternatively, a 1000 cell (or larger) detector can be used with a small aperture and auxiliary illumination to achieve working ranges of 20 inches on 100% UPC.

The small number of tall cells combined with a small F-number permits a system optimized for performance and miniaturization. Such a system can operate down to 1 lux of ambient light with no auxiliary illumination.

With a 40 degree field of view, 512 cells and a 1 mm wide aperture the optimum working focal distance $L_R$ for 6.6 mil codes is estimated to be 3.1 inches with an estimated working range of 1.5 to 4.6 inches. For 100% UPC code, $L_R$ is estimated to be 4.3 inches with an estimated working range of 1.8 to 6.1 inches. This system has 0.7 inches of working range on 2 mil codes. With integration times from 1 ms to 30 ms and two gain settings (unity and 30) the system can operate in ambient lighting as low as 0.4 fc (foot-candles) at the in-focus position and 5 fc at the out-of-focus limit, assuming 35% minimum reflective difference, 24 dB minimum Signal-to-Noise Ratio (SNR) at the out-of-focus limit and 12 dB minimum SNR at the in-focus position. Typical home lighting is 20 to 50 fc, typical office lighting is 100 fc and direct sunlight is 9000 fc, all which would provide more than enough ambient light for the system to function.

System parameters are chosen such that the high blur digitizer provides adequate working range in minimal lighting conditions. The detector array parameters are based on an existing and proven solid state sensor design. Improvements to the minimum required ambient light can be made at the expense of working range and/or tolerance to rotational misalignment. For consumer scanning systems where long working range is not required, a system with a medium blur digitizer can be designed by decreasing the aperture to match the performance of a system with the high blur digitizer. However, with respect to working range the high blur digitizer enables greater freedom in trading off range for minimum lighting requirements compared to a system with a medium blur digitizer.

The one-dimensional imaging system may use a CMOS detector with 512 cells and an image length of 4 mm as noted above. The focus length required for a field of view of 40 degrees is about 5 mm. With a 1 mm wide by 3 mm high aperture the effective F-number of the system is 2.6. The system needs a small fraction of the light (~0.015) compared to CCD-based systems to achieve similar signal-to-noise and can operate down to 0.4 fc ambient light, and therefore does not require auxiliary illumination.

The imaging system parameters used in this analysis are summarized as follows:

| Field of View | 40 degrees |
| --- | --- |
| Focus distance | 3 inches (76.2 mm) |
| Detector length | 4 mm |
| Focal length | 5.12 mm |
| Aperture size | 1 mm wide by 3 mm high |
| Number of cells | 512 |
| Cell width | 7.8 $\mu$m |
| Cell height | 125 $\mu$m |
| Quantum efficiency | .2 (a typical value for a CMOS process) |
| Conversion gain | 3.2 $\mu$V/electron |
| Dark current | 19 mV/second |
| Saturation level | 800,000 electrons |
| Cell capacitance | 50 fF |
| KTC noise | 90 electrons rms @ 300 K |

Many conventional CCD-based one-dimensional imagers utilize hardware digitizers similar to a flying-spot laser bar code reader. Hardware digitizers typically produce a single bit of quantization, and are limited in complexity compared to software digitizers. Hardware digitizers can handle very little blur; thus, the existing CCD-based systems have a very large F-number to achieve large depth of focus. The CCD-based system needs very high resolution due to the low signal (large F-number) and hardware digitizer. Novel algorithms, such as the high blur digitizer of the above-mentioned He et al. application, enable sufficient performance with only 512 cells as opposed to several thousand cells required in conventional one-dimensional images. With an aperture width of 1 mm all bar code densities lower than 5 mil have blur limited (not cell per module limited) working range.

The He et al. digitizer contains three separate digitizers: low blur, medium blur and high blur. The low blur algorithm uses an adjustable thresholding scheme and requires about 80% modulation in the highest spatial frequency of the received signal. The medium blur algorithm uses a more complicated thresholding scheme and requires about 30% modulation in the highest frequency. The high blur digitizer requires about 30% modulation in the second highest spatial frequency and infers the highest frequency edges from this information.

Working range of a bar code reader depends on a number of factors including bar code density, field of view and blur limits of the system. For example, using the above described system the calculated achievable working range for a bar code of 6.6 mil density is between 1.5 and 4.6 inches assuming digitization sufficient to tolerate a pixel per model ratio of less than one. It has been determined that a system with this working range could be implemented with a solid state detector with as few as 400 cells.

Computing signal as a function of ambient illumination is complicated due to the multiwavelength nature of ambient light and the different spectral characteristics of the numerous light sources (e.g., several different fluorescent lights and incandescent lights). The model used here assumes that the light source is monochromatic (550 nm) to simplify the computation. Fluorescent lights have a strong component at 550 nm, but most of the energy of incandescent light is in the red and near infrared. Thus, the results presented here are most accurate for fluorescent lighting, but represent worst case conditions in general. For incandescent lighting the minimum lighting requirements are much less than predicted by this computation.

Figure 5:
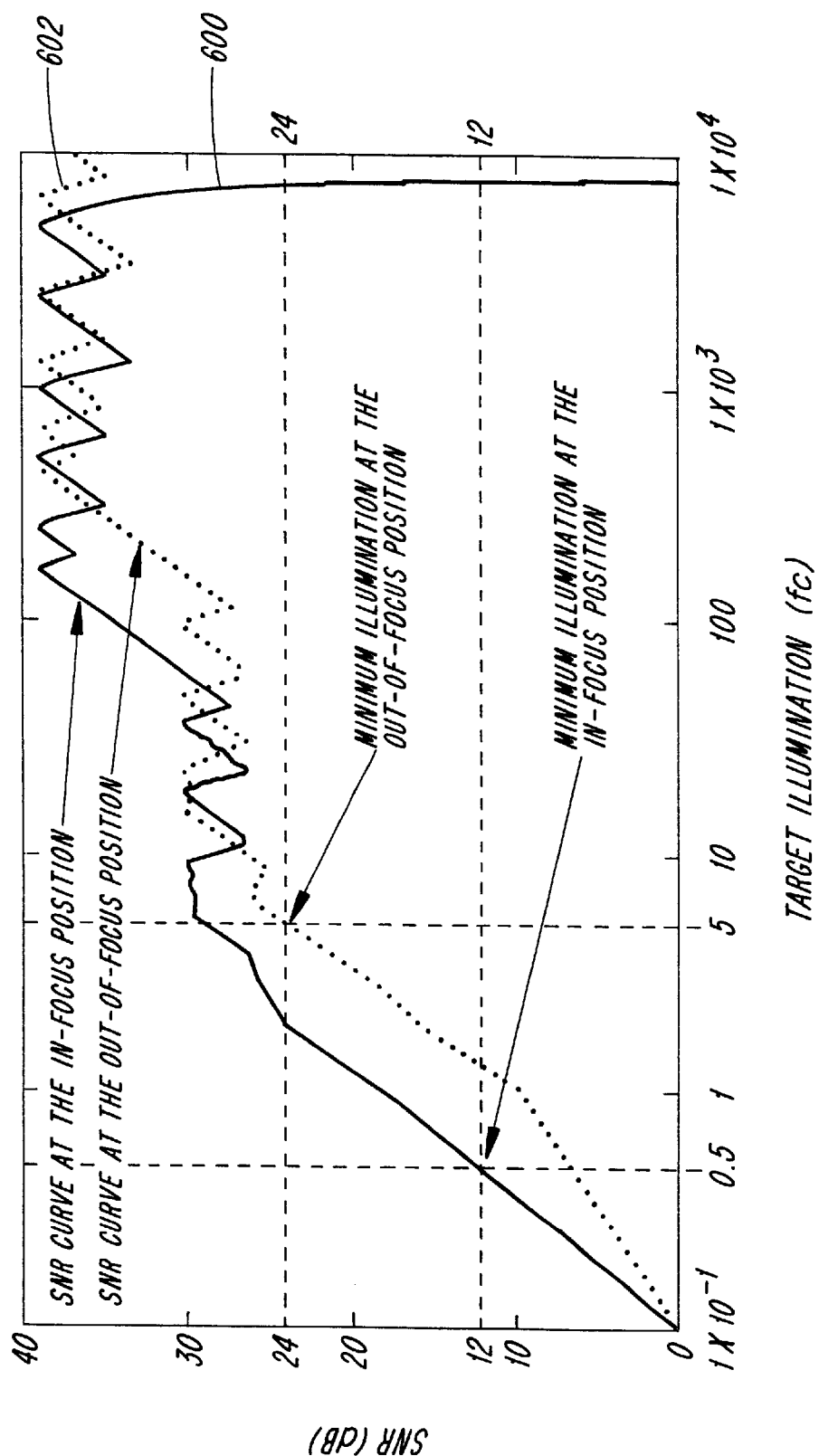
FIG. 5 is a graph illustrating the relationship of focus position, signal-to-noise ratio and target illumination associated with certain embodiments of the present invention.

The calculated signal-to-noise ratio of the above described one-dimensional photo sensor system is presented in FIG. 5 as a function of target illumination for 6.6 mil symbols at the in-focus position (solid curve 600) and the out-of-focus limit (dashed curve 602).

A summary of ambient lighting requirements for several bar code densities is given in the following Table I.

TABLE I

| | Range of ambient lighting (fc) | | | |
| --- | --- | --- | --- | --- |
| Bar code density | In-focus position | | Out-of-focus limit | |
| (mils) | Low | High* | Low | High |
| 5 | .6 | 9000 | 5 | 9000 |
| 6.6 | .5 | 8100 | 5 | 9000 |
| 7.5 | .45 | 7700 | 5 | 9000 |
| 10 | .4 | 7000 | 5 | 9000 |
| 100% UPC | .4 | 6700 | 5 | 9000 |
| 20 | .4 | 6500 | 5 | 9000 |

*This ambient light limitation can be increased by permitting integration times smaller than 1 ms.

For this example the detector array has a cell height of 125 $\mu$m which corresponds to a detector footprint of 1 mm on the object at the in-focus position. If the detector array is misaligned with the bar code, then the blur due to cell averaging is increased. The imaging system proposed here can tolerate up to 17 degrees rotation on 6.6 mil codes and 40 degrees rotation on 100% UPC. Working ranges for several rotation angles are given in the following Table II.

TABLE II

| | Working range (inches) | | | | | |
| --- | --- | --- | --- | --- | --- | --- |
| Density | 6.6 mil | | | 13 mil (100% UPC) | | |
| Rotation angle (degrees) | Near | Far | Range | Near | Far | Range |
| 0 | 1.5 | 4.6 | 3.1 | 1.8 | 6.1 | 4.3 |
| 5 | 1.5 | 4.4 | 2.9 | 1.8 | 5.9 | 4.1 |
| 10 | 1.6 | 3.9 | 2.3 | 1.8 | 5.5 | 3.7 |

TABLE II-continued

| | Working range (inches) | | | | | |
|---|---|---|---|---|---|---|
| Density | 6.6 mil | | | 13 mil (100% UPC) | | |
| Rotation angle (degrees) | Near | Far | Range | Near | Far | Range |
| 15 | 1.9 | 3.2 | 1.3 | 1.8 | 4.8 | 3 |
| 17 | 2 | 2.8 | 0.8 | 1.8 | 4.6 | 2.8 |
| 20 | | | | 1.8 | 4.3 | 2.5 |
| 25 | | | | 1.8 | 3.8 | 2 |
| 30 | | | | 1.8 | 3.3 | 1.5 |
| 35 | | | | 1.8 | 2.9 | 1.1 |
| 40 | | | | 1.8 | 2.5 | 0.7 |

Tolerance to rotational misalignment can be traded off for required ambient lighting by varying the cell height. Because cell size affects cell capacitance (and therefore conversion gain and kTC noise) the tradeoff of cell height must be analyzed in the context of the sensor electronics design.

The linear sensor-based code reading engines of the present invention may be implemented using the molded optical packages described in connection with FIGS. 1, 2 and 3. Alternatively, such engines can be fashion illustrated in FIGS. 6 and 7.

Figure 6:
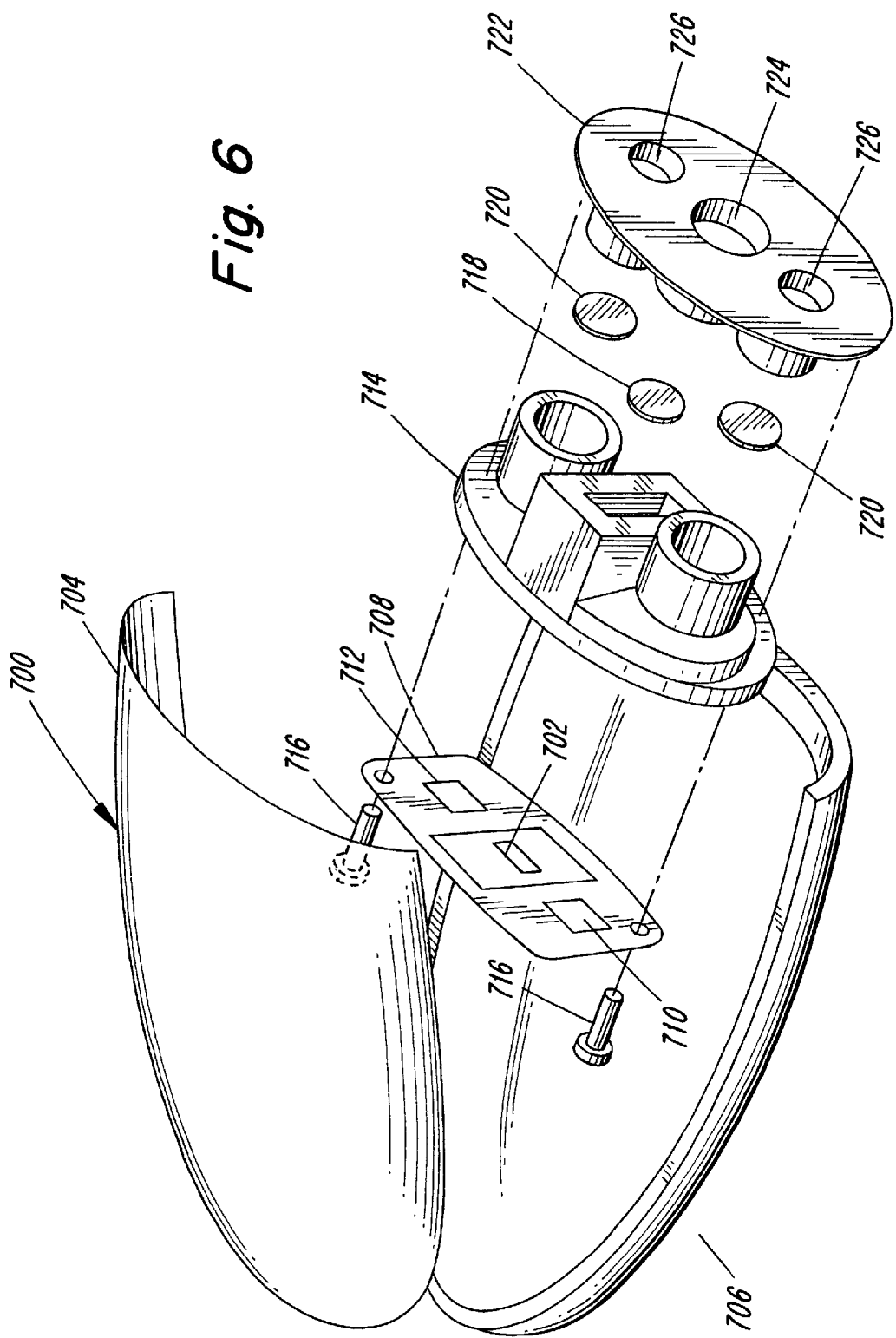
FIG. 6 is an exploded pictorial view of a hand held optical code imager embodiment of the present invention.

FIG. 6 is an exploded pictorial view of a handheld optical code imager 700, employing a solid state one-dimensional photo sensor 702. The imager assembly includes housing halves 704 and 706 for containing a circuit board 708 to which the photo sensor 702 is attached and electrically connected. The circuit board may also carry solid state aiming or illumination devices such as LEDs or laser diodes 710 and 712.

The circuit board 708 may be mechanically attached to housing front member 714, for example, by fasteners 716. Imager lens 718 and illumination or aiming lenses 720 may be held in position in or against the housing front member 714 by housing face member 722. Aperture 724 admits the light sensed by the photo sensor 702. Aiming or illumination light exits the imager housing through apertures 726.

Figure 7:
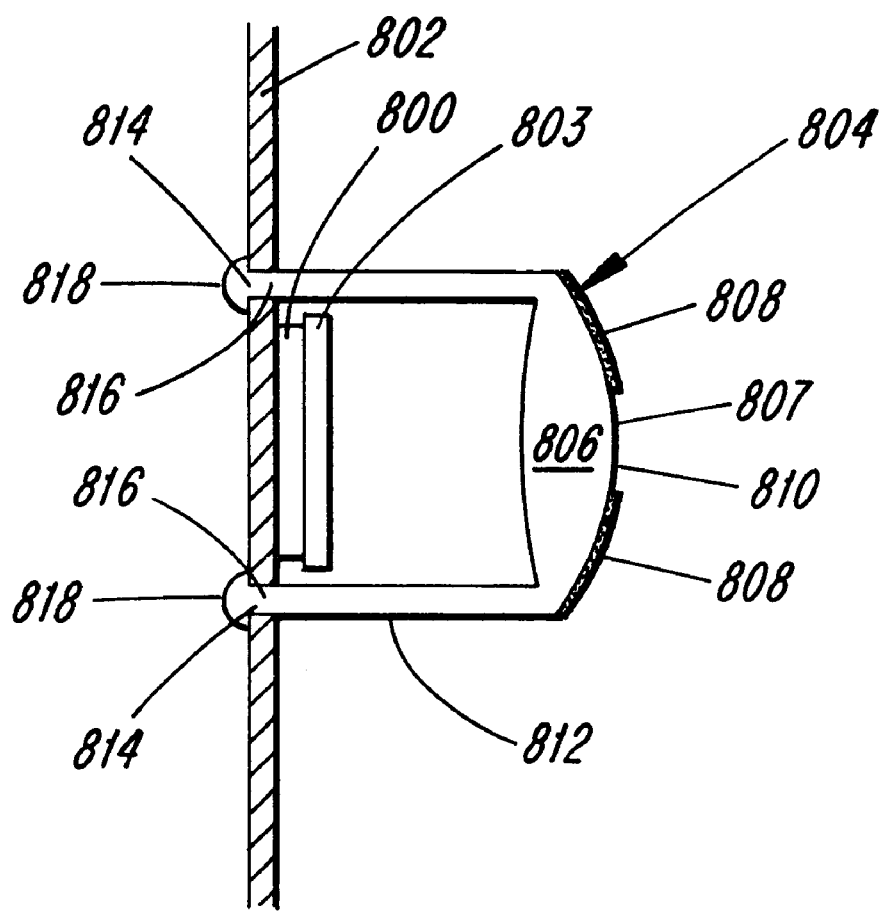
FIG. 7 is a cross-sectional view of a photo sensor optical assembly embodiment of the present invention.

FIG. 7 illustrates a further alternative structure for the photo sensor optical assembly. A solid state sensor die 800 such as a linear array detector may be surface-mounted on a circuit board 802. A glass cover slip 803 protects the optically receptive surface of the die 800. A molded transparent plastic cap 804 includes an objective lens portion 806. The system aperture 807 may be defined by an opaque layer 808 on the lens surface 810, or by the cylindrical sleeve portion 812 of the cap 804. The cylindrical sleeve 812 may be formed with attachment pins 814 which may be inserted into corresponding holes 816 in the circuit board 802. The ends 818 of the pins 814 may be heat-flaired to hold the cap in position with respect to the solid state sensor die 800 and, thus maintain the correct focal length for the system.

The described embodiments of the present invention are intended to be illustrative rather than restrictive, and are not intended to represent every embodiment of the present invention. Various modifications and variations can be made to the disclosed systems without departing from the spirit or scope of the invention as set forth in the following claims both literally and in equivalents recognized in law.

We claim:

1. An apparatus for an optical code reader comprising:
   a one-dimensional solid state photo sensor for producing electronic signals corresponding to a target optical code symbol;
   means for focusing light from the target optical code symbol on the photo sensor including at least one lens surface spaced less than 15 mm from the solid state photo sensor and for providing an aperture, such that the reader has an F-number of 15 or less, said light focusing means being fabricated from a clear compound having an index of refraction greater than 1 and encasing at least a portion of said photo sensor such that said photo sensor and compound form a solid unitary body;
   aperture means for limiting the transmission of light through at least a portion of said clear compound; and
   electronic digitizer means for converting the electronic signals from the solid state photo sensor to bit content of the target symbol.

2. The apparatus of claim 1, wherein the solid state photo sensor has less than 1024 cells.

3. The apparatus of claim 1, wherein the at least one lens surface is spaced at a maximum of 5 mm from the solid state photo sensor and the F-number is equal to 5 or less.

4. The apparatus of claim 1, wherein the apparatus has a maximum volume of one cubic centimeter.

5. The apparatus of claim 1, wherein the apparatus can read 6.6 mil density bar codes, through a working range of at least between 1½ and 4.6 inches.

6. The apparatus of claim 1, wherein the photo sensor cells are rectangular with an aspect ratio of at least 8:1.

7. The apparatus of claim 1, wherein the photo sensor has no more than 512 rectangular cells which are less than 10 $\mu$m wide.

8. The apparatus of claim 1, wherein the apparatus has a cats-eye shaped aperture with a major axis of 3 mm and a minor axis of 1 mm.

9. The apparatus of claim 1, wherein the apparatus has an elliptical shaped aperture.

10. The apparatus of claim 1, wherein the apparatus has a focus distance of between 2 and 6 inches and reads standard bar code symbols at that distance without supplemental illumination.

11. The apparatus of claim 10, wherein the apparatus reads such bar code symbols in ambient light conditions of 5 foot-candle or less.

12. The apparatus of claim 10, wherein the apparatus reads such bar code symbols in ambient light conditions of 0.5 foot-candle or less.

13. An apparatus for an optical code reader comprising:
   a one-dimensional solid state photo sensor having 500 cells or less for producing electronic signals corresponding to a target optical code symbol; and
   means for focusing an image of the target optical symbol on the photo sensor, the focusing means having an F-number less than 3 and a focal length of 5 mm, said focusing means being fabricated from a clear compound having an index of refraction greater than 1 and encasing at least a portion of said photo sensor such that said photo sensor and compound form a solid unitary body.

14. An apparatus for an optical code reader comprising:
   a one-dimensional solid state photo sensor having an array of cells for producing electronic signals corresponding to a target optical code symbol;
   means for focusing light from the target optical code symbol on the photo sensor: having at least one lens surface spaced a distance of less than 5 mm from the solid state photo sensor, said lens fabricated from a portion of a clear compound encasing at least a portion of said photo sensor such that said photo sensor and compound form a solid unitary body, said clear compound having an index of refraction greater than 1 and providing an aperture such that the focusing means has an F-number less than 10; and an electronic digitizer for converting electronic signals from the photo sensor such that the ratio of the number of cells representing information from the target optical code symbol to the number of modules represented in target code focused on the photo sensor by the focusing means is one to one or less.

15. The apparatus of claim 14, wherein the electronic digitizer is implemented with a microprocessor and software.

* * * * *